(12) United States Patent
Castellanos et al.

(10) Patent No.: US 7,933,814 B2
(45) Date of Patent: Apr. 26, 2011

(54) METHOD AND SYSTEM TO DETERMINE IF A COMPOSITE SERVICE LEVEL AGREEMENT (SLA) CAN BE MET

(75) Inventors: Maria G. Castellanos, Sunnyval, CA (US); Mehmet Sayal, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2707 days.

(21) Appl. No.: 10/672,356

(22) Filed: Sep. 26, 2003

(65) Prior Publication Data
US 2005/0080893 A1 Apr. 14, 2005

(51) Int. Cl.
*G06Q 10/00* (2006.01)

(52) U.S. Cl. ......... 705/28; 705/1; 705/7; 707/4; 707/10; 707/100; 707/602; 709/224; 709/227; 709/229; 709/232

(58) Field of Classification Search ............... 705/28
See application file for complete search history.

(56) References Cited

U.S. PATENT DOCUMENTS

| | | | |
|---|---|---|---|
| 5,864,483 A | 1/1999 | Brichta | |
| 6,332,163 B1* | 12/2001 | Bowman-Amuah | 709/231 |
| 6,430,160 B1 | 8/2002 | Smith et al. | |
| 6,523,027 B1* | 2/2003 | Underwood | 707/4 |
| 2003/0079160 A1* | 4/2003 | McGee et al. | 714/39 |
| 2003/0110067 A1* | 6/2003 | Miller et al. | 705/8 |
| 2004/0153563 A1* | 8/2004 | Shay et al. | 709/232 |

OTHER PUBLICATIONS

"3Com announces nest step in Transcendware software, enables creation and management of service level agreements." Business Wire, p. 03311183, Mar. 31, 1997.*

* cited by examiner

*Primary Examiner* — F. Zeender
*Assistant Examiner* — Fawaad Haider

(57) ABSTRACT

A method and system for determining whether a composite service level agreement (SLA) may be met. An exemplary method comprises calculating a baseline metric value for a plurality component service level agreements (SLA) and comparing the baseline metric value to historical metric values for each of the plurality of component services.

20 Claims, 3 Drawing Sheets

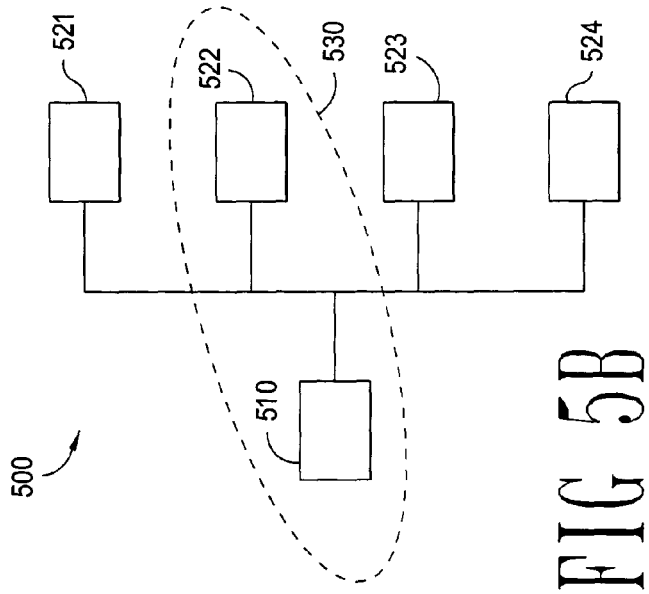
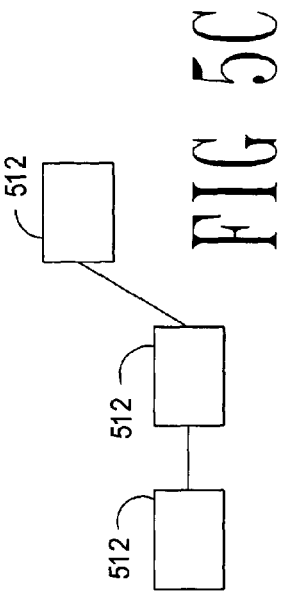
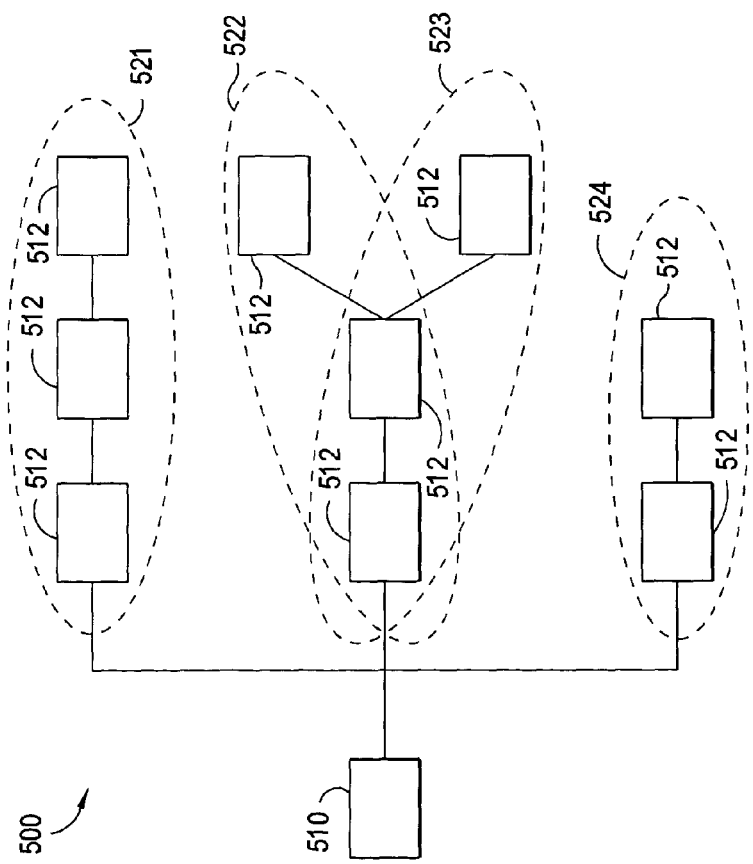

METHOD AND SYSTEM TO DETERMINE IF A COMPOSITE SERVICE LEVEL AGREEMENT (SLA) CAN BE MET

BACKGROUND

Providing services and commercial transactions via a web-based distributed computing is becoming a dominant method of conducting business. A business organization may partner with other internal organizations or outside vendors to bring a service or product to a customer. In an example in which a customer is purchasing a book, the order may be placed through a composite service. The customer may access the composite service by a web-based graphical user interface (GUI) on his or her own computer, using an internet or other network connection. To the customer, several individual component services appear to work as a single, integrated (or "composite") service with which the customer interacts.

The first component service may be a warehouse inventory service having several functions, including querying inventory, reporting when the item can be shipped, and providing an order confirmation number. A second component service may be a payment-processing vendor with a plurality of functions, including requesting a credit card number from the customer upon checkout and verifying the submitted information. Functions may be event-based messages or other business tasks carried out between the various services. The composite service may be responsible for providing the customer with a response, such as an e-mail or confirmation screen including order details.

When requesting a good or service, a customer generally expects that a response will be provided shortly after his or her order is placed. Accordingly, the composite service may issue a reply to the customer in the form of a confirmation screen or e-mail. If the reply delivery takes longer than expected, the customer may lose confidence in the business. It is therefore desirable to set and meet a goal of providing a response or action to the customer within a given time period. The expected level of performance (or reply time, in this example) is referred to as a "service level agreement" (SLA). Each individual function carried out between the component services and the composite service may have a unique associated SLA.

What is needed is a mechanism to detect component SLA conflicts to determine if a composite SLA can be met.

SUMMARY

The problems noted above are addressed in large part by a method and system for determining whether a composite service level agreement (SLA) may be met. One exemplary embodiment may be a method that comprises calculating a baseline metric value for each of a plurality of component service level agreements, and comparing the baseline metric value to a historical metric value for each of the component SLAs to determine if a conflict exists.

BRIEF DESCRIPTION OF THE DRAWINGS

For a detailed description of the embodiments of the invention, reference will now be made to the accompanying drawings in which:

FIG. 5A illustrates hybrid parallel/sequential component services in accordance with embodiments of the invention;

FIG. 5B illustrates a simplified view of the system of FIG. 5A in accordance with embodiments of the invention; and FIG. 5C illustrates a more detailed view of one cluster of the hybrid case illustrated in FIG. 5A in accordance with embodiments of the invention.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . "

The term "computer" is intended to mean a computing entity, which may be a server, terminal, personal or other computer, or a network of computing entities working together as a unit. The term "server" refers to a computing entity which may be linked to and performing some service for one or more computing entities. The term "datastore" refers to a computing entity housing a collection of data organized for search and retrieval, such as relational databases, directory services, or in some instances even some types of defined or open format text files. The term "network" encompasses any of the various pathways computers or systems may use for communication with each other including Ethernet, token-ring, wireless networks, or the internet.

The term "application" refers to an executable software package or program that can be run on a computing entity. The term "interface" refers to a mode of interaction between a user and computer, or alternately, between two computing systems or applications. The term "function" refers to a computing transaction or message passed between computing entities.

DETAILED DESCRIPTION

The following discussion is directed to various embodiments of the invention. Although one or more of these embodiments may be preferred, the embodiments disclosed should not be interpreted, or otherwise used, as limiting the scope of the disclosure. In addition, one skilled in the art will understand that the following description has broad application. Further, the discussion of any embodiment is meant only to be exemplary of that embodiment, and not intended to intimate that the scope of the disclosure is limited to that embodiment.

Figure 1:
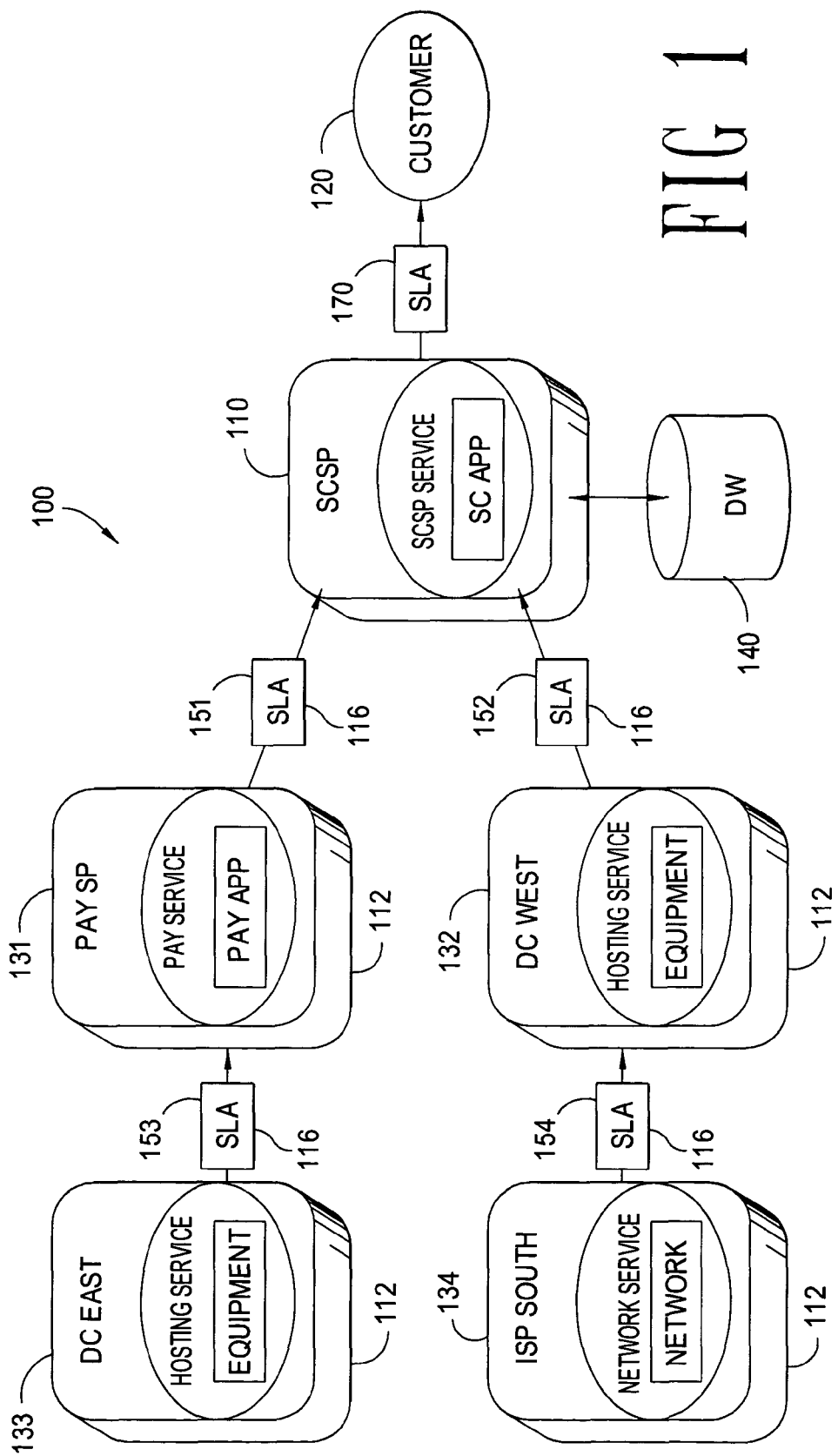
FIG. 1 illustrates a web-services-based model including a composite service and plurality of component services in parallel and sequential configuration in accordance with embodiments of the invention.

The representative embodiments disclose detecting service level agreement (SLA) conflicts between various computing systems. FIG. 1 illustrates a web-services-based system 100, comprising an exemplary composite service 110 linked with a plurality of component services 112. Composite service 110 and component services 112 may interact with each other in a predetermined fashion, such that two linked services pass functions, or messages. Monitoring the performance of the services and the interactions may be important, as inadequate performance of one component service may adversely impact the performance of the composite service.

In the exemplary system 100, composite service 110 may be a composite supply chain service provider (SCSP) dependent on the component services 112, such as exemplary pay service provider (Pay SP) 131 and exemplary hosting service of data center (DC) West 132. In turn, pay service provider 131 may depend on exemplary hosting service of data center (DC) East 133. Component service DC West 132 may depend on exemplary ISP service provider (ISP South) 134, which may be an Internet service provider. It will be understood that composite service 110 may be a separate entity (i.e., a program run on a different computer, possibly in a different location) from component services 112, but may provide the functionality of the component services to a user through a single interface. A data warehouse (DW) 140 may serve as a data repository, storing historical performance data concerning component systems and functions.

The system of FIG. 1 illustrates a composite service 110 with component services 112 working both parallel and sequentially. In particular, hosting service DC East 133 and pay service 131 may operate sequentially. Hosting service DC East 133 and pay service 131 as a group may operate in parallel with exemplary ISP service provider 134 and hosting service DC West 132. An SLA 116 exists between each pair of services that interact. A business promises a customer 120 a certain level of service, denoted by composite SLA 170. Each individual component service 131-134 has an associated SLA 151-154, respectively.

Exemplary component services Pay SP 131 and DC West 132 act in parallel with one another, such that composite service 110 can conduct transactions with both simultaneously. Consequently, the Pay SP SLA 151 and the DC West SLA 152 may individually need to operate within sufficient constraints to meet the requirements of composite SLA 170. Conversely, exemplary component services Pay SP 131 and DC East 133 act sequentially. In order for the DC West SLA 152 to be met, the ISP South SLA 154 may need to be met. Thus, when a composite service 110 uses component services 112, the SLA 170 (target SLA or target metric value) it can guarantee to a customer is dependent on the SLAs of its component services.

Embodiments of the invention are directed to detecting SLA shortcomings of the component SLAs that may jeopardize meeting the composite SLA. The following notation is used for convenience of the discussion:

Y: metric threshold that is promised in the composite SLA
X: desired success rate—percentage of time that threshold Y is promised to be satisfied
$Y_i$: metric threshold that component service $S_i$ has to meet
$X_{Pi}$: historical success rate—percentage of the time that component service $S_i$ has achieved threshold $Y_i$ in the past
X': total allowed failure rate for all services
$F_T$: combined historical failure rate
$X_i$: required success rate for component service $S_i$
$X_i'$: allowed failure rate for component service $S_i$
$F_i$: contribution to the combined historical failure rate for each component service $S_i$ (share of service $S_i$ in the total historical failure rate $F_T$).

Before committing to a transaction, a determination as to whether a composite service can guarantee a given SLA (in which the composite service may provide to meet threshold Y for X % of the time) given SLAs of component services. The component services may execute in parallel or sequentially, and different methods for detecting SLA conflicts may exist for each case.

In embodiments where the component services are executed in parallel, values of $Y_i$ may be assumed to be equal to Y (i.e., all component services $S_i$ have to meet threshold Y). Consider an exemplary system that comprises two component services (P1, P2) operating in parallel with historical success rates of $X_{P1}$=90 and $X_{P2}$=85. The desired success rate for the composite service in this example may be X=90, or 90%. The following method, to be explained in greater mathematical detail later, may be used to detect SLA conflicts for component services operated in parallel:

1. The total allowed failure rate for the composite service may be calculated by subtracting the desired success rate for the composite system from 100:

(100−90)=10%

2. (a) Historical success rates for the component services may be 90 and 85, as determined from historical values for each of the component services.
   (b) The combined historical failure rate of the component services may be calculated by subtracting the historical success rate for each service from 100 and summing the results:

(100−90)+(100−85)=10+15=25

(c) The contribution of each component service to the combined historical failure rate may be calculated by subtracting the historical success rate for the particular component service from 100, and dividing by the combined historic failure rate of step 2(b):

For component service P1: (100−90)/25=10/25=0.4

For component service P2: (100−85)/25=15/25=0.6

(d) The allowed failure rate for each component service may be calculated by multiplying the result obtained in step 2(c) with the total allowed failure rate calculated in step 1:

For component service P1: 10(0.4)=4

For component service P2: 10(0.6)=6

(e) The required success rate for each component service, in order to meet the component SLA, may be calculated by subtracting the value obtained in step 2(d) from 100.

For component service P1: 100−[4]=96

For component service P2: 100−[6]=94

3. For each component service, the required success rate (calculated in step 2(e)) may be compared with its historical success rate (step 2(a)). If for any component service the historical success rate is less than the required success rate, then a conflict is indicated and the composite SLA may not be promised. In the example shown, for component service P1 the historical success rate of 90 is less than the required success rate of 96, so a conflict is indicated. For service P2, the historical success rate of 85 is less than the required success rate of 94, so a conflict is indicated. In this example with historical success rates $X_{P1}$ and $X_{P2}$ of the component services and the desired success rate X of the composite system, conflicts are indicated for both component services. The preceding example illustrates the use of desired success rates and historical success rates to determine if a conflict is indicated for the component SLAs of component services. However, it will be understood that failure rates could equivalently be used to determine the presence of a conflict. The term baseline metric value should be read to comprise either use of a required success rate or a corresponding failure rate.

In another example, a composite service includes two component services ($P_1$, $P_2$) operating in parallel, with historical success rates of $X_{P1}=95$ and $X_{P2}=90$. These exemplary historical success rates could be for a response metric of $Y \leq 48$ hours. The desired success rate for the composite service in this example is $X=80$, or 80%. The following exemplifies not only calculations to determine if a conflict exists given the assumptions and metrics above, but also illustrates the mathematical relationships of the calculation method in a general sense.

1. Calculate the total allowed failure rate X' for all services:

$$X'=(100-X)$$

$$X'=(100-80)=20$$

2(a). Calculate the percentage $X_{Pi}$ that service $S_i$ has achieved $Y_i$ (i.e., 48 hours) in the past, according to historical data. In this example, historical success rates $X_{Pi}$ for each component service $S_i$ (where i=1,2) are given to be:

$$X_{P1}=95$$

$$X_{P2}=90$$

(b) Calculate the combined historical failure rate $F_T$ of the component services, using:

$$F_T=\Sigma(100-X_{Pi})=(100-X_{P1})+(100-X_{P2})=(100-95)+(100-90)=5+10=15$$

(c) Calculate the contribution $F_i$ to the combined historical failure rate $F_T$ of each component service $S_i$ using:

$$F_i=(100-X_{Pi})/F_T=(100-X_{Pi})/\Sigma(100-X_{Pi})=F_1: (100-X_{P1})/15=(100-95)/15=5/15=0.333 F_2: (100-X_{P2})/15=(100-90)/15=10/15=0.667$$

(d) Calculate the allowed failure rate $X_i$ for each component service $S_i$ according to its $F_i$, using:

$$X_i'=X'*F_i$$

$$X_1'=X'(0.333)=20(0.333)=6.67$$

$$X_2'=X'(0.667)=20(0.667)=13.3$$

(e) Calculate the required success rate $X_i$ for service $S_i$ in order to avoid a conflict with percentage X and threshold Y, using:

$$X_i=100-X_i'$$

$$X_1=100-[6.67]=93.3$$

$$X_2=100-[13.3]=86.7$$

3. For each component service $S_i$, the required success rate $X_i$ may be compared with historical performance $X_{Pi}$. If for any component service $S_i$, $X_{Pi} \geq X_i$ is not satisfied, then a conflict is indicated, and consequently, the composite SLA of the composite service cannot be promised.

For $P_1$: $X_{P1}=95$, $X_1:=93.3$ $X_{P1}$ is $\geq X_1$, so a conflict is not indicated.

For $P_2$: $X_{P2}=90$, $X_2=86.7$ $X_{P2}$ is $\geq X_2$, so a conflict is not indicated.

Based on the historical performance $X_{P1}$ and $X_{P2}$ of the component services and the required success rate X of the composite service, no conflicts are indicated in this example, and the composite SLA should be able to be met.

Other embodiments of the invention may be directed to detecting SLA conflicts between sequential component services. In the sequential case, metric threshold $Y_i$ may not be fixed because it may not be clear how much of the metric threshold Y promised in the composite SLA is attributed to each component service $S_i$. However, it may be known that the sum of the individual component thresholds $Y_i$ may sum to Y (i.e., $\Sigma Y_i = Y$).

Figure 2:
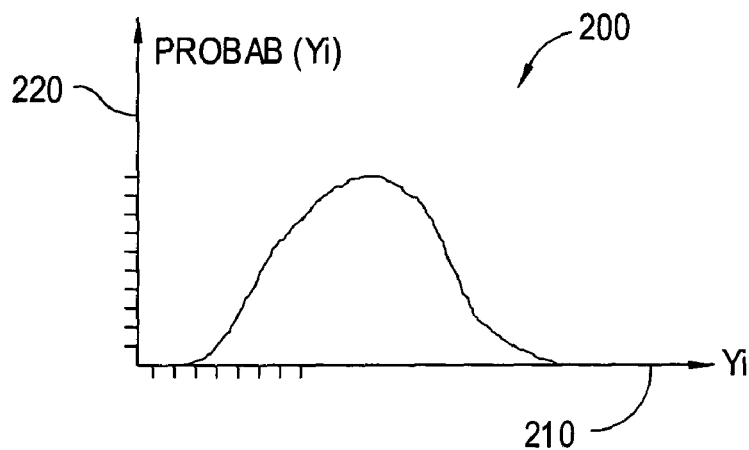
FIG. 2 illustrates a probability distribution function (PDF) for conflict detection in sequential dependence in accordance with embodiments of the invention.

In accordance with embodiments of the invention, determining SLA conflicts for systems with sequential component services may begin by calculating a probability distribution function (PDF) for each component service $S_i$, based on historical data. The PDF may be the probabilities for attaining various values of metric threshold $Y_i$. The metric threshold $Y_i$ could be, for example, the probability of the various response times that component services $S_i$ have provided in the past. The PDF may be calculated, for example, using a variety of computational models or software tools, such as MATLAB® manufactured by The MathWorks, Inc. An exemplary continuous PDF plot 200 is illustrated in FIG. 2, where the horizontal axis 210 may represent values of $Y_i$, and the vertical axis 220 may represent probability values for each particular value of $Y_i$.

Figure 3:
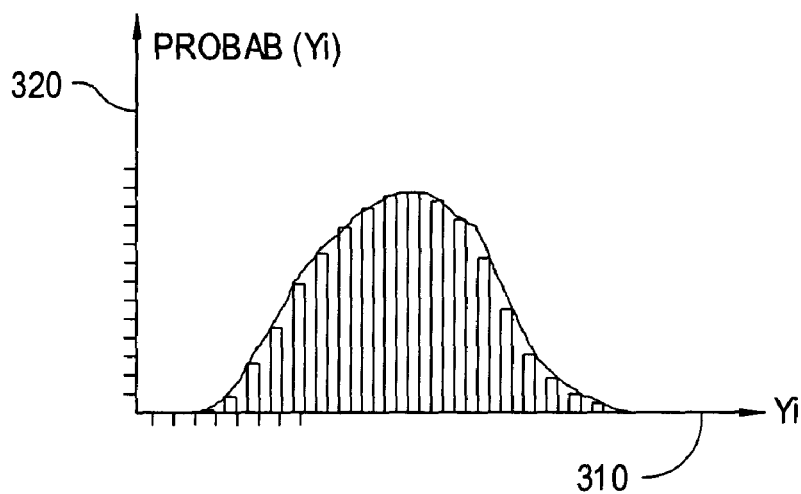
FIG. 3 illustrates the PDF of FIG. 2 discretized into an exemplary histogram in accordance with embodiments of the invention.

A next step may be discretizing each PDF into a histogram, an example of which is illustrated in FIG. 3 under the continuous curve. The horizontal axis 310 may represent values of $Y_i$, and the vertical axis may represent probability values $Y_i$ value occurring.

Figure 4:
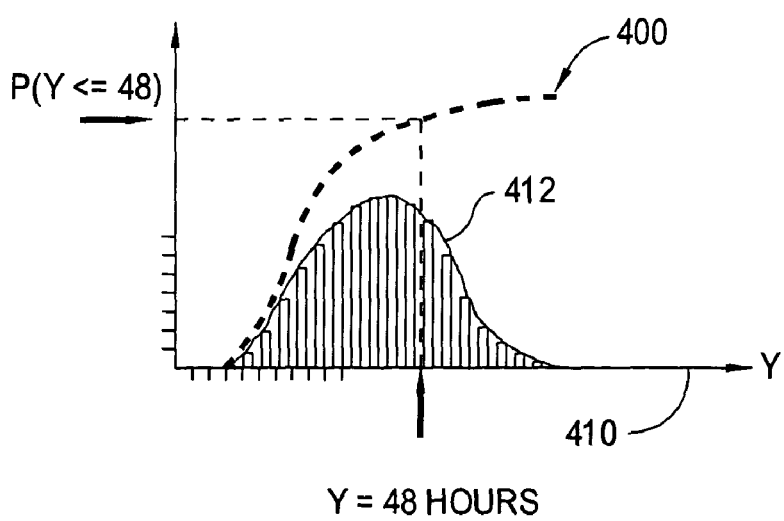
FIG. 4 illustrates a cumulative distribution function (CDF) for the sequential conflict detection in accordance with embodiments of the invention.

After creating a histogram for each component service, the next step may be computing a composite PDF from individual component service histograms, possibly using a convolution method (discussed below). The composite PDF may yield a continuous or discretized curve of the probability of obtaining each value of Y for sequential component services. FIG. 4 illustrates a composite PDF 412. Thus, to determine the probability of obtaining or achieving the metric threshold Y, that value may be obtained from the composite PDF. Note, however, that use of the composite PDF exemplified in FIG. 4 may only reveal the probability of obtaining a particular metric threshold Y.

After calculating the composite PDF, the next step may be calculating a cumulative distribution function (CDF). Of concern when determining whether a composite SLA may be met given a plurality of sequentially operated component services may be whether the metric threshold Y and all values below (or alternatively above) that value may be met. The cumulative distribution function may thus be a summation of each probability from the composite PDF curve to the point of interest. Referring again to FIG. 4, for an exemplary metric threshold Y<=48 hours, the probability of achieving Y<=48 may be the sum of each probability from zero to and including Y=48. This curve is illustrated as CDF plot 400 in FIG. 4. Thus, the requested response time (e.g., a particular Y value) can be selected on the horizontal axis and followed vertically until the CDF curve 400 is met. This point on the curve 400 can be traced horizontally to the corresponding probability value to obtain the target metric value, or estimated probability P(Y).

Next, the desired success rate X and the probability of achieving the required response P(Y) may be compared. If X>100*P(Y), then a conflict exists, as the probabilities of the component services $S_i$ result in a probability that does not meet the required probability threshold. If $X \leq 100*P(Y)$, no conflict exists, and the customer-directed composite service SLA can be promised.

As an example, consider a composite service that comprises two component services $S_1$ and $S_2$ operating sequentially. The desired success rate for the composite system is $X=90$, meaning a desired response time (e.g., $Y \leq 48$ hours) is satisfied at least 90% of the time. The steps above may be performed order to calculated a CDF, an example of which is illustrated in FIG. 4. The composite service metric threshold of $Y=48$ hours is located in the CDF. From there, the corresponding estimated probability $P(Y)$ of achieving the required response time Y can be obtained. If an estimated probability value of $P(Y)=0.8$ is obtained for this example, then $X>100*P(Y)$, and a conflict exists. If a $P(Y)$ value of 0.95 is obtained, then $X \leq 100*P(Y)$, and no conflict is indicated. While the preceding discussion has been directed to cumulative distribution functions of the probability of success, it will be understood that cumulative distribution functions based on the probability of failure may be equivalently used. The term combined metric value should be read to comprise either CDFs of success or failure.

Determining a composite PDF may require performing a convolution. Convolution may be a computational method wherein an integral expresses the amount of overlap of one function $g(x)$ as it is shifted over another function $f(x)$. Convolution may therefore "blend" one function with another. Convolution of two continuous functions $f(x)$ and $g(x)$ over a finite range may be given by the equation:

$$f*g = \int_0^t f(\tau) g(t-\tau) d\tau$$

where the symbol "f*g" (occasionally also written as $f \otimes g$) denotes the convolution of f and g. Convolution may be taken over an infinite range, as shown in the equation:

$$f*g = \int_{-\infty}^{\infty} f(\tau) g(t-\tau) d\tau = \int_{-\infty}^{\infty} g(\tau) f(t-\tau) d\tau$$

In the context of the embodiments of the invention, convolution allows a user to combine probabilities for each component service to obtain the composite PDF.

As illustrated in FIG. 1, a composite system may have component services working both parallel and sequentially. FIG. 5A illustrates a web-based system 500 with a composite service 510 and a plurality of component services 512. In this conceptual view, the component services 512 have been grouped into clusters 521-524, with each cluster representing a unique execution path in the overall process flow. The overall process flow of FIG. 5A may present a hybrid parallel/serial case. To identify a conflict for this hybrid case, the algorithm for the parallel case may be applied to the system 500 to determine if a conflict exists in any of the execution paths.

FIG. 5A illustrates a simplified view of FIG. 5B, in which the individual component services 512 in each cluster 521-524 are illustrated as a single entity. In this way, the clusters 521-524 can be viewed as component services working in parallel. If the parallel conflict detection method identifies a conflict in the execution path 530 involving composite service 510 and cluster 522, then further calculations can focus on the component services within the cluster.

FIG. 5C illustrates a cluster 522 in which an exemplary conflict was detected. The sequential conflict detection method, as previously discussed, may now be applied to the three component services 512 of cluster 522 (FIG. 5A) arranged in sequence. The individual component service(s) 512 that are responsible for the conflict can then be identified. Using this method, a conflict can be detected within a hybrid system.

The methods of the various embodiments do not assume a uniform probability distribution. Rather, the calculations of the various embodiments may consider actual distributions specified by historical data (from which uniform distribution is a particular case). Further, the embodiments may allow a user to calculate a higher-confidence composite SLA, based on actual historical data concerning the individual component SLAs.

The exemplary steps discussed with respect to the parallel and sequential cases may be performed by a computer program operated on any computer in a computing system. In some embodiments, the program(s) executed to determine if conflicts exist may operate on the computer executing the composite services. In alternative embodiments, a separate computer coupled to the computer(s) executing the component and composite services may execute the programs that make the determination as to whether conflicts exist.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of determining whether a composite service level agreement (SLA) may be met comprising:
   calculating a baseline metric value for each of a plurality of component SLAs in a computing system that operate to form a composite SLA;
   comparing a historical metric value for each of the plurality of component SLAs to their respective baseline metric value to determine if each historical metric is sufficient to ensure that the composite SLA is met.

2. The method as defined in claim 1 wherein calculating the baseline metric value for each of the plurality of component SLAs further comprises calculating a baseline success rate for each of the plurality of component SLAs from historical data.

3. The method as defined in claim 2 wherein comparing the historical metric value for each of the plurality of component SLAs further comprises comparing a historical success rate for each of the plurality of component SLAs to their respective baseline success rates to determine if each historical success rate is greater than or equal to each respective baseline success rate.

4. The method as defined in claim 1 wherein calculating a baseline metric value for each of the plurality of component SLAs further comprises calculating a baseline failure rate for each of the plurality of component SLAs from historical data.

5. The method as defined in claim 4 wherein comparing a historical metric value for each of the plurality of component SLAs further comprises comparing a historical failure rate for each of the plurality of component SLAs to their respective baseline failure rates to determine if each historic failure rate is less than or equal to the respective failure rate for each of the component SLAs.

6. The method of claim 1, further comprising indicating that the composite SLA cannot be met in response to determining that any of the historical metric values is insufficient when compared to the respective baseline metric value.

7. The method of claim 3, further comprising indicating that the composite SLA cannot be met in response to determining that any of the historical success rates is less than the respective baseline success rate.

8. The method of claim 5, further comprising indicating that the composite SLA cannot be met in response to determining that any of the historical failure rates is greater than the respective baseline failure rate.

9. The method of claim 1, wherein calculating the baseline metric value for each of the plurality of component SLAs is based on a desired success rate for a composite system having multiple component services associated with the corresponding component SLAs.

10. The method of claim 9, wherein calculating the baseline metric value for each of the plurality of component SLAs is further based on:
calculating a combined historical failure rate of the component services; and
determining a contribution of each component service to the combined historical failure, wherein each baseline metric value is based on the respective determined contribution.

11. The method of claim 1, further comprising:
calculating a combined metric value from historical data for sequential component SLAs that operate sequentially to contribute to the composite SLA; and
comparing the combined metric value to a target combined metric value to determine if the combined metric value is sufficient to meet the target combined metric value.

12. The method of claim 11, wherein calculating the combined metric value further comprises calculating a component probability distribution function (PDF) for each sequential component SLA.

13. The method of claim 12, wherein calculating the combined metric value further comprises computing a composite PDF from the component PDFs.

14. The method of claim 13, wherein computing a composite PDF from the component PDFs further comprises performing a convolution of the component PDFs for each component SLA.

15. The method of claim 13, wherein calculating the combined metric value further comprises:
calculating a cumulative distribution function (CDF) from the composite PDF;
determining the combined metric value by locating a value of the cumulative CDF at the target combined metric value.

16. A computer readable medium storing programs executable by a processor that, when executed, perform a method comprising:
calculating a baseline metric value for each of a plurality of component SLAs in a computing system that operate to form a composite SLA;
comparing a historical metric value for each of the plurality of component SLAs to their respective baseline metric value to determine if each historical metric value is sufficient to ensure that the composite SLA is met.

17. The computer readable medium as defined in claim 16 wherein calculating the baseline metric value for each of the plurality of component SLAs further comprises calculating a baseline success rate for each of the plurality of component SLAs from historical data.

18. The computer readable medium as defined in claim 17 wherein comparing the historical metric value for each of the plurality of component SLAs further comprises comparing a historical success rate for each of the plurality of component SLAs to their respective baseline success rates to determine if each historical success rate is greater than or equal to each respective baseline success rate.

19. The computer readable medium as defined in claim 16 wherein calculating a baseline metric value for each of the plurality of component SLAs further comprises calculating a baseline failure rate for each of the plurality of component SLAs from historical data.

20. The computer readable medium as defined in claim 19 wherein comparing a historical metric value for each of the plurality of component SLAs further comprises comparing a historical failure rate for each of the plurality of component SLAs to their respective baseline failure rates to determine if each historic failure rate is less than or equal to the respective failure rate for each of the component SLAs.

* * * * *